United States Patent [19]
Alcon

[11] Patent Number: 5,319,336
[45] Date of Patent: Jun. 7, 1994

[54] LEVITATION DEVICE

[76] Inventor: Andrew R. Alcon, 7432 Yolanda Dr., Fort Worth, Tex. 76112

[21] Appl. No.: 605,574

[22] Filed: Oct. 29, 1990

[51] Int. Cl.$^5$ .................... H01F 3/00; H02K 41/00
[52] U.S. Cl. ................................. 335/296; 310/12; 310/90.5
[58] Field of Search .......................... 104/281–286, 104/292; 335/245, 302, 296, 216; 310/90.5

[56] References Cited

U.S. PATENT DOCUMENTS

| | | |
|---|---|---|
| 2,377,175 | 5/1945 | Peer . |
| 3,327,265 | 6/1967 | van Geuns et al. . |
| 3,589,300 | 6/1971 | Wipf . |
| 3,892,185 | 7/1975 | Guderjahn . |
| 4,797,386 | 1/1989 | Gyorgy et al. . |
| 4,910,633 | 3/1990 | Quinn . |

OTHER PUBLICATIONS

E. H. Brandt, Levitation in Physics, Jan. 20, 1989, pp. 349–354.

*Primary Examiner*—Leo P. Picard
*Assistant Examiner*—Raymond Barrera
*Attorney, Agent, or Firm*—Mark A. Oathout

[57] ABSTRACT

The present invention provides an improved magnetic levitation system for the stable or rigid levitation of a body. The object to be levitated is maintained in an equilibrium position above a flat guideway or a plurality of continuous guideways. The rigidity of the levitation is at least in part achieved by the orientation of the axis through the poles of the magnet in a direction perpendicular to the direction of relative motion between the magnet and the conductor.

15 Claims, 2 Drawing Sheets

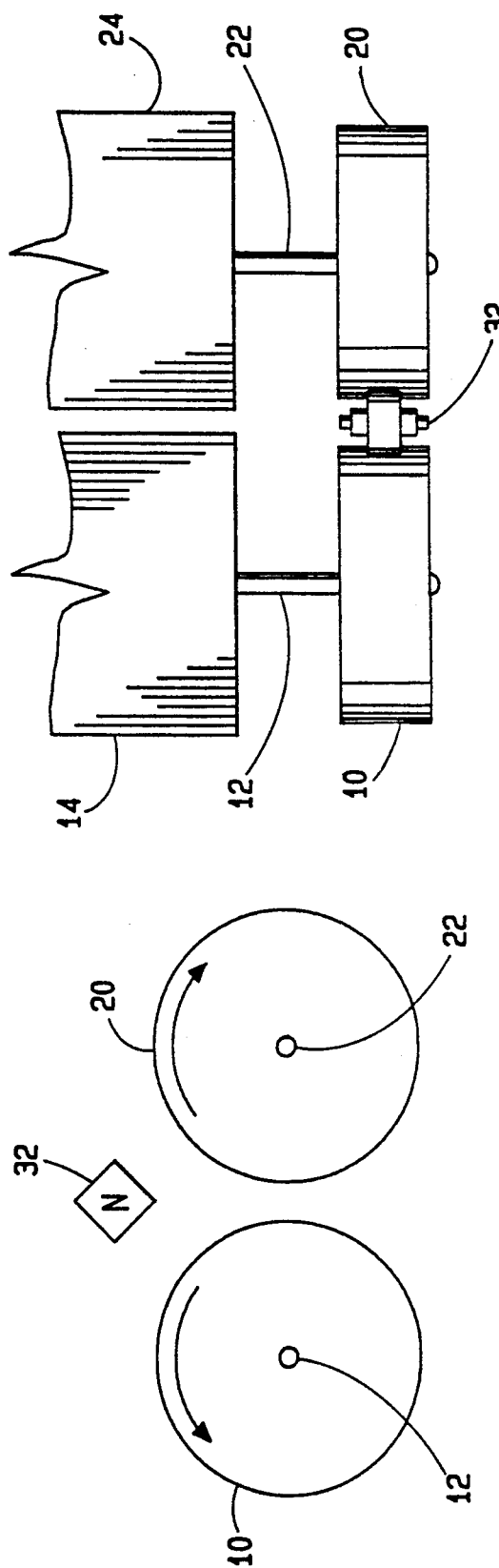
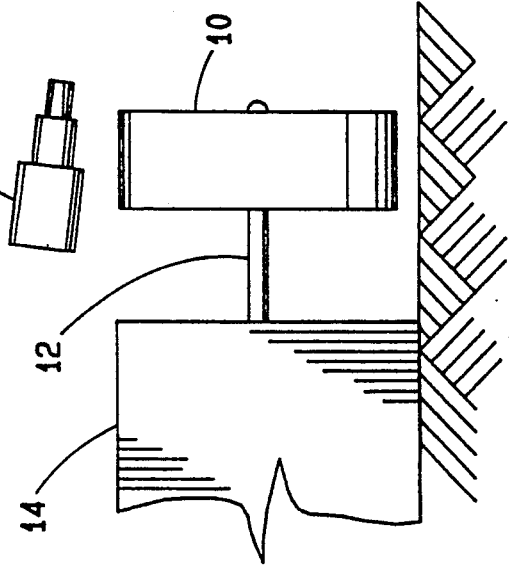
FIG. 6
FIG. 7
FIG. 5

LEVITATION DEVICE

BACKGROUND OF THE INVENTION

2. Field of the Invention

The present invention generally relates to a magnetic levitation system and, more particularly, is concerned with a magnetic levitation system for the stable levitation of a body.

2. Description of the Prior Art

An electromotive force is produced in a conductor when there is a change in magnetic flux through a conductor. Thus relative motion between a conductor and a magnetic field will cause a conductor to cut the flux of the magnetic field producing an induced electromotive force across the conductor. Currents set-up in a substance by variation of an applied magnetic field are called eddy currents. Energy is dissipated by eddy currents usually in the form of heat. Eddy currents in a moving conductor also react with the magnetic field to produce retardation of the motion and thus have a damping effect on the motion. The induced currents produce a magnetic field above the conductor which opposes the original magnetic field.

Magnetic levitation of an object has been achieved in various forms in the past. This technology is currently being developed for application in magnetically levitated trains.

U.S. Pat. No. 3,327,265 to Geuns et al describes a magnet which is levitated above a superconducting material where two apertures are cut in the superconducting material to cause the magnet to align in a certain direction.

U.S. Pat. No. 3,589,300 to Wipf discloses a magnetic suspension system where a propelled magnet is levitated by repulsion from eddy currents that are induced in a continuous conductor. In this invention the axis through the poles of the magnet extends in the same direction as the continuous conductor. Stabilization of the levitation is achieved by constructing the conductor with short bars or legs to produce restoring forces created by the eddy currents induced in the short bars or legs.

U.S. Pat. No. 3,892,185 to Guderjahn discloses an improved magnetic suspension system where the guideway is formed from a combination of non-ferromagnetic material and ferromagnetic material. The guideway is formed in the shape of a channel having top, bottom and side portions to provide a more rigid suspension and one more resistant to oscillations. Any displacement of the magnet from the middle of the channel will result in restoring forces which tend to move the magnet back to an equilibrium position.

U.S Pat. No. 4,797,386 to Gyorgy et al discloses the use of superconducting elements to induce lateral stabilization in a magnet created either by a permanent magnet or a magnetic field created by a flowing current. Gyorgy et al state that through the use of a superconducting material, lateral stabilization can be achieved above a superconducting element which is planar, or an inverted cup shape.

All of the above prior practices address the topic of rigid or stable levitation which is the attempt to maintain the levitated body in an equilibrium position. The inventions of Wipf and Guderjahn require that the guideway be designed with a more complex geometric configuration, such as a surface with more than one side to achieve lateral stable levitation. Geuns et al and Gyorgy et al require superconducting materials to achieve stable levitation. None of the prior practices recognize the importance of the orientation of the magnet with respect to the direction of relative motion between the magnet and the conductor in achieving rigid levitation.

A need therefore exists for a magnetic levitation system which achieves rigid levitation above a flat guideway without the use of superconducting materials or sidewalls for stabilization. Such a guideway could be constructed at a much lower cost and would be useful in applications such as magnetic levitation of trains and studies of aerodynamic flow around bodies.

SUMMARY OF THE INVENTION

The present invention provides an improved magnetic levitation system for the levitation and lateral stabilization of a body. The term "lateral" refers to forces acting on or around the poles of the magnet. "Lateral stabilization" is synonymous with "rigid levitation" and "equilibrium". "Retardation force" refers to a force of resistance to relative forward motion between a magnet and a conductor. This force is analogous to drag in aerodynamics. The object to be levitated is maintained in an equilibrium position above a flat guideway. The rigidity of the levitation is at least in part achieved by the orientation of the axis through the poles of the magnet in a direction perpendicular to the direction of relative motion between the magnet and the conductor.

BRIEF DESCRIPTION OF THE DRAWINGS

FIG. 5 is a schematic front elevational view of the levitation of a rectangular magnet.

FIG. 6 is a schematic top view of the levitation of a combination of magnets.

FIG. 7 is a schematic side view of the levitation of an unbalanced combination of magnets.

DETAILED DESCRIPTION OF THE INVENTION

Figure 1:
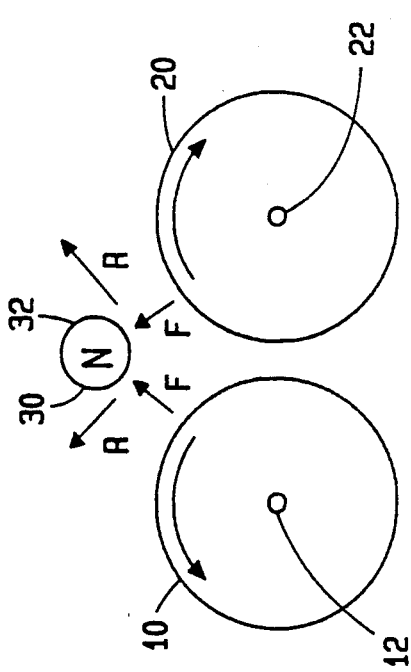
FIG. 1 is a schematic front elevational view of the invention described herein.

The eddy currents induced in a conductor produce repulsive forces (including levitation and lateral forces) and a retardation force. According to Lenz's Law induced currents will at every instant flow in a conductor in a direction to oppose any change in the applied magnetic flux. If the current varies, the associated magnetic flux also changes in direct proportion causing a back electromagnetic force. This is self-inductance. Referring to FIG. 1, this back electromagnetic force is the mirror image of the magnetic flux field generated by magnet 32 and can be schematically represented as forces of repulsion F and S (FIGS. 2 and 3) between a first disc 10, a second disc 20 and a body 30. A retardation force R is also generated by the electromagnetic field.

Figure 2:
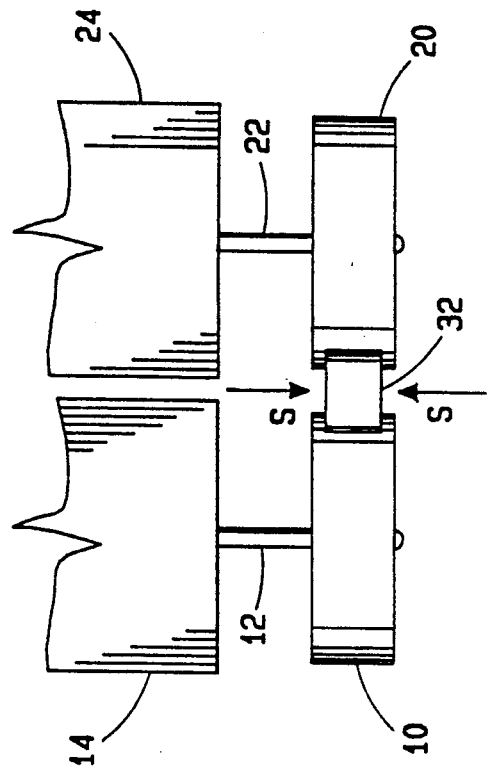
FIG. 2 is a schematic top view of the invention.
Figure 3:
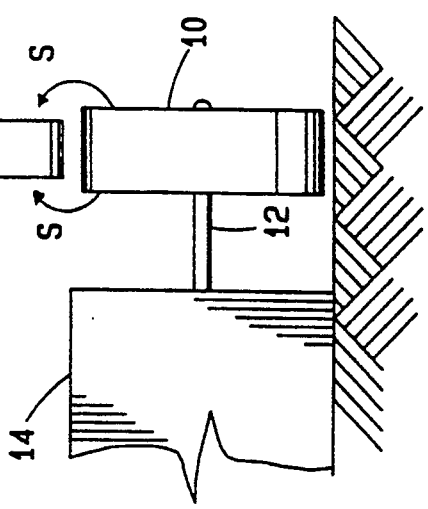
FIG. 3 is a schematic side view of the invention.

Referring to FIGS. 1-3, first disc 10 is juxtapositional with respect to second disc 20. First disc 10 and second disc 20 are cylindrical and preferably have the same diameter and the same thickness. Both first disc 10 and second disc 20 are connected through their respective axis of rotation 12 and 22 to a prime mover 14 and 24, respectively. The prime movers impart a rotational drive to first disc 10 and second disc 20. The drive of the prime movers is adjustable so that first disc 10 and second disc 20 can be driven at different rotational velocities. The first disc 10, the second disc 20 and all conductors discussed herein are preferably constructed from a non-ferromagnetic conductor such as aluminum or copper. Brass has also been used but the repulsive forces are weakened due to the lower conductivity properties of brass.

The first disc 10 and the second disc 20 are driven by the prime mover such that they will rotate in opposite directions as represented by the arrows in FIG. 1. The direction of rotation is important to achievement of lateral stable levitation in this embodiment.

A body 30 is then placed above and between the rotating discs 10 and 20. The body 30 as shown is a cylindrically shaped high energy, rare earth magnet 32 such as neodymium iron boron or samarium cobalt. Referring specifically to FIG. 1, the axis which runs through the poles of the magnet 32, runs in a direction which is perpendicular to the face of the drawing or in the same direction as the axis of rotation of each disc 10 and 20.

As the discs or conductors 10 and 20 cut the magnetic flux, the induced potential difference is proportional to the rate of change of the flux. The repulsive force is proportional to the rate of change of the current where each conductive material includes a coefficient of self-inductance.

The effects of electromagnetic induction will cause a repulsive forces F to be created between first disc 10 and magnet 32 and between second disc 20 and magnet 32. If the rotating discs are rotating at similar velocities, the retardation forces created by each rotating disc 10 and 20 on magnet 32 will act at right angles to each other and will further stabilize the magnet 32 above and between the rotating discs 10 and 20. If only one disc were being rotated the retardation force created would have an orbital effect on the magnet 32 causing the magnet 32 to orbit around the disc in the same direction as the direction of rotation of the disc until interrupted by gravity.

The interaction between the magnet 32 and the rotating discs 10 and 20 acts to align the magnet 32 such that the axis through the poles is parallel to the axes of rotation 12 and 22 of the discs 10 and 20. These lateral stability forces are the forces which maintain the magnet 32 in a state of rigid levitation. The uniformity of the flux field emanating from the ends of the magnet 32 provide the basis for this equilibrium effect. Such stabilizing forces are caused by electromagnetic induction and repel or oppose the flux field generated by the magnet 32.

If the direction of rotation of both discs 10 and 20 is reversed and the magnet 32 is placed above and between the rotating discs 10 and 20, the retardation forces will have the effect of pulling the magnet 32 down between the rotating discs 10 and 20 to create a "pinching effect". If the magnet 32 is placed below and between the rotating discs 10 and 20 when the discs 10 and 20 are rotated in the direction as indicated in FIG. 1 a similar "pinching effect" is created since the retardation forces will cause the magnet 32 to be pulled up between the rotating discs 10 and 20. There is an important relationship between the retardation forces and the size of the magnet 32 being pulled up or down, whatever the case may be, by such retardation forces. This is because achievement of the "pinching effect" is dependent upon the retardation forces and gravity overcoming the repulsive forces when the magnet is placed above the rotating discs 10 and 20 and the retardation forces overcoming the forces of repulsion and gravity when the magnet is placed below the rotating discs 10 and 20.

There appears to be a relation between the size of the magnet relative to the disc and the magnitude of the retardation forces. It may not be possible to achieve the "pinching effect" with a relatively large magnet compared to the size of the disc since retardation forces of sufficient magnitude cannot be created to overcome the repulsive forces. A light magnet 32 is needed to achieve the "pinching effect" from beneath the rotating discs 10 and 20 to overcome the force of gravity.

Figure 4:
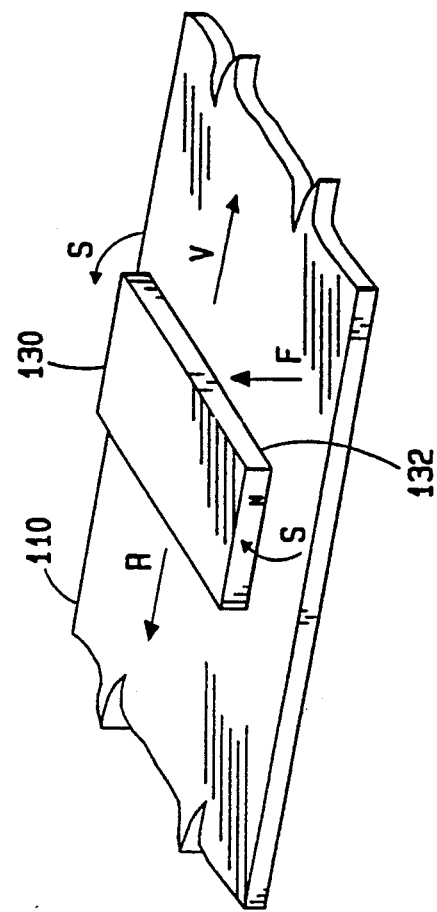
FIG. 4 is a schematic perspective view of another embodiment of the invention.

In order to achieve lateral stable levitation a threshold relative velocity must be reached between the magnet 32 and the conductor. Below this threshold velocity stability and levitation quickly decay. At velocities above this threshold velocity, the back electromotive forces or repulsive forces appear constant or independent of velocity. However, retardation forces are dependent on velocity and actually decrease as velocity increases. As explained by E. H. Brandt in "Levitation in Physics" published in Science Vol. 243, p. 352, this is because the retardation force is a result of the ohmic loss in the conductor during induction. At lower velocities the retardation force is greater since there is more time for the eddy currents to decay before the rear end of the magnet 32 passes by, whereas at higher velocities there is less time for eddy currents generated by the front end of the magnet 32 to decay before the rear end of magnet 32 passes by. The conductor is also heated due to the resistance in the conductor. Referring to FIG. 4, relative motion can also be created between the magnet 132 and guideway or conductor 110 by moving the magnet 132 at a velocity V with respect to a guideway 110 constructed of a conductive material such as aluminum. As previously defined, the axis through the poles of the magnet 132 is parallel to the plane of the guideway 110 and perpendicular to the direction of relative motion which is in the same direction as the lengthwise direction of the guideway 110. Once the magnet 132 reaches a threshold speed its magnetic force will be balanced by the self-inducting repulsive force and the magnet 132 will be levitated above the conducting guideway 110. Since electromagnetic induction will also create stabilizing forces on the ends or poles of the magnet 132, the magnet 132 will be stabilized and levitated in an equilibrium position as the magnet 132 moves down the guideway 110.

Hence when the magnet 132 is placed such that the axis through poles is parallel to the plane of the guideway 110 and perpendicular to the direction of movement, the levitated body 130 will be stabilized even though the guideway 110 is constructed from a flat or planar, one-sided conductor. This results in greatly reduced costs in the construction of the guideway 110.

It is to be appreciated that various objects can be attached on top of the magnet 132 to form the body 130 propelled down the guideway 110. By increasing the velocity and/or magnetic flux or by decreasing the mass of the body 130, more massive bodies can be levitated by the system. If the guideway 110 is constructed of materials having greater conductive qualities the repulsive force can also be increased while the retardation force will be decreased.

EXAMPLES

The invention described herein was tested by varying materials, sizes of discs, sizes of magnets and geometric shapes of magnets. The tests were carried out utilizing two rotating discs in a juxtapositional relationship. Aluminum discs were most commonly used although copper was also tested. Lateral stable levitation was achieved with both these materials. Cylindrical magnets were normally used during the test. The magnets varied in diameter from ¼ inch, ⅜ inch, ½ inch, ¾ inch to 1 inch. The lengths of the magnets varied from 1/5 of an inch to 1½ inches. The discs usually were two inch diameter discs and were ⅜ inch thick. The magnets were levitated regardless of whether the magnet was shorter or wider than the thickness of the discs.

Magnets having a geometrical shape other than a cylindrical shape were also tested and levitated. For instance, magnets having rectangular (FIG. 5), square and toroid shapes were levitated. Moreover, cylindrical magnets of different sizes were connected together and levitated (FIG. 6). FIG. 7 depicts the levitation of an unbalanced group of magnets. In this example the axis through the poles of the magnet 232 is not parallel but acute to the axis of rotation of disc 10 and 20.

Larger and heavier magnets of the same composition as smaller and lighter ones are levitated at about the same relative velocity due to the increased surface area generating a magnetic field in the larger and heavier magnet. The threshold velocity was found to depend upon the tangential velocity of the disc and not the rotational velocity.

Since the repulsive forces generated by induction are the mirror image of the field creating the self-induction, magnets with greater field strengths will generate greater repulsive forces. Samarium cobalt materials can produce an energy product of approximately 26 million gauss/ostreds (MGO) and neodymium iron boron about 35 MGO. Some weaker magnets tested were barium ferrite (3.5 MGO) and alnico (9 MGO). These magnets generated fields which were too weak to levitate the mass of the magnetic body. Magnetic fields generated by electromagnetic coils or superconduction can also be used to generate the magnetic field used to create levitation in the invention described herein.

The preferred embodiment of the invention has been shown and described above. It is to be understood that minor changes in the details, construction and arrangement of the parts may be made without departing from the spirit or scope of the invention as described and claimed.

I claim:

1. An improved magnetic levitation system for the lateral stable levitation of a body, comprising:
   magnet means forming at least a portion of the body and creating a magnetic flux formed from two opposite magnetic poles;
   a non-superconducting conducting guideway below said magnet means;
   said magnet means being positioned such that an axis which runs through the magnetic poles is in a plane acute to the horizontal and is perpendicular to a direction of relative motion of said non-superconducting conducting guideway; and
   the system being operable to impart a motion to said magnet means relative to said non-superconducting conducting guideway which produces eddy currents in said non-superconducting conducting guideway creating a levitation force and a lateral stabilization force between said magnet means and said non-superconducting conducting guideway creating a levitation force and a lateral stabilization force between said magnet means and said non-superconducting conducting guideway wherein the relative motion between said magnet means and said non-superconducting conducting guideway is greater than a threshold velocity required to achieve levitation given conditions of a magnetic field strength of said magnet means and a mass of the body.

2. The magnetic levitation system according to claim 1 wherein said non-superconducting conducting guideway comprises a first disc, which is operable to rotate around a central axis and a second disc which is operable to rotate around a central axis and placed juxtapositional relative to said first disc such that when said first disc and said second disc are rotated in opposite directions at relatively equivalent velocities, a retardation force and the levitation force created by the eddy currents will stabilize said magnet means between said discs.

3. The magnetic levitation system according to claim 1, wherein said magnet means is a geometrically shaped body selected from the group of geometrical shapes consisting of cylinders, rectangles, squares, toroids and combinations thereof.

4. The magnetic levitation system according to claim 1, wherein said magnet means is permanent magnet.

5. The magnetic levitation system according to claim 1, wherein said non-superconducting conducting guideway includes a metal from the group consisting of aluminum, copper, silver and gold.

6. The magnetic levitation system according to claim 1, wherein said magnet means is an electromagnet.

7. The magnetic levitation system according to claim 1, wherein said magnet means is a superconducting magnet.

8. An improved magnetic levitation system for the lateral stable levitation of a body, comprising:
   magnet means forming at least a portion of the body and creating a magnetic flux formed from two opposite magnetic poles;
   a non-superconducting conducting guideway below said magnet means;
   said magnet means being positioned such that an axis which runs through the magnetic poles is in a horizontal plane and is perpendicular to a direction of relative motion of said non-superconducting conducting guideway; and
   the system being operable to impart a motion to said magnet means relative to said non-superconducting conducting guideway which produces eddy currents in said non-superconducting conducting guideway creating a levitation force and a lateral stabilization force between said magnet means and said non-superconducting conducting guideway wherein the relative motion between said magnet means and said non-superconducting conducting guideway is greater than a threshold velocity required to achieve levitation given conditions of a magnetic field strength of said magnet means and a mass of the body.

9. The magnetic levitation system according to claim 8, wherein said non-superconducting conducting guideway comprises a first disc, which is operable to rotate around a central axis and a second disc which is operable to rotate around a central axis and placed juxtapositional relative to said first disc such that when said first disc and said second disc are rotated in opposite directions at relatively equivalent velocities, a retardation force and the levitation force created by the eddy currents will stabilize said magnet means between said discs.

10. The magnetic levitation system according to claim 8, wherein said magnet means is a geometrically shaped body selected from the group of geometrical shapes consisting of cylinders, rectangles, squares, toroids and combinations thereof.

11. The magnetic levitation system according to claim 8, wherein said non-superconducting conducting guideway includes a metal from the group consisting of aluminum, copper, silver and gold.

12. The magnetic levitation system according to claim 8, wherein said magnet means is an electromagnet.

13. The magnetic levitation system according to claim 8, wherein said magnet means is a superconducting magnet.

14. An improved magnetic levitation system for the rigid levitation of a body, comprising:

magnet means forming at least a portion of the body including a magnetic flux formed from two opposite magnetic poles;

a first disc having a surface which is operable to rotate around a central axis;

a second disc having a surface which is operable to rotate around a central axis;

said magnet means being interposed above said first and said second disc and positioned such that an axis which runs through the magnetic poles is in a horizontal plane and is perpendicular to a direction of relative motion of said surface of said first and said second discs; and the system being operable to impart motion to said magnet means relative to said first and said second disc which produces eddy currents in said first and said second disc creating a levitation force and a lateral stabilization force between said magnet means and said first and said second disc wherein the relative motion between said magnet means and said first and said second discs is greater than a threshold velocity required to achieve levitation given conditions of a magnetic field strength of said magnet means and a mass of the body.

15. The magnetic levitation system according to claim 8, wherein said magnet means is a permanent magnet.

* * * * *